| (12) | United States Patent | (10) Patent No.: | US 9,123,969 B2 |
|---|---|---|---|
| | Sastry et al. | (45) Date of Patent: | *Sep. 1, 2015 |

(54) ELECTRIC VEHICLE PROPULSION SYSTEM AND METHOD UTILIZING SOLID-STATE RECHARGEABLE ELECTROCHEMICAL CELLS

(71) Applicant: SAKTI3, INC., Ann Arbor, MI (US)

(72) Inventors: Ann Marie Sastry, Ann Arbor, MI (US); Fabio Albano, Ann Arbor, MI (US); Chia-Wei Wang, Ypsilanti, MI (US); Robert Kruse, Ann Arbor, MI (US); Jeffrey Lebrun, Ann Arbor, MI (US)

(73) Assignee: Sakti3, Inc., Ann Arbor, MI (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/515,310

(22) Filed: Oct. 15, 2014

(65) Prior Publication Data

US 2015/0214573 A1    Jul. 30, 2015

Related U.S. Application Data

(63) Continuation of application No. 14/083,325, filed on Nov. 18, 2013, now Pat. No. 8,889,285, which is a continuation of application No. 13/911,015, filed on Jun. 5, 2013, now Pat. No. 8,623,543, which is a continuation of application No. 13/648,429, filed on Oct. 10, 2012, now Pat. No. 8,492,023, which is a continuation of application No. 13/294,980, filed on Nov. 11, 2011, now Pat. No. 8,357,464.

(60) Provisional application No. 61/471,072, filed on Apr. 1, 2011.

(51) Int. Cl.
| H01M 6/46 | (2006.01) |
|---|---|
| H01M 10/0562 | (2010.01) |
| H01M 10/0565 | (2010.01) |
| H01M 10/054 | (2010.01) |
| H01M 10/0525 | (2010.01) |

(52) U.S. Cl.
CPC ........ *H01M 10/0562* (2013.01); *H01M 10/054* (2013.01); *H01M 10/0525* (2013.01); *H01M 10/0565* (2013.01); *H01M 2300/0071* (2013.01); *H01M 2300/0082* (2013.01)

(58) Field of Classification Search
CPC .................. H01M 2300/0065; H01M 10/0431
USPC ........................................................ 429/152
See application file for complete search history.

(56) References Cited

U.S. PATENT DOCUMENTS

| 5,338,625 A | * | 8/1994 | Bates et al. | .................. 429/322 |
|---|---|---|---|---|
| 6,982,132 B1 | * | 1/2006 | Goldner et al. | ............... 429/162 |
| 2004/0151985 A1 | * | 8/2004 | Munshi | ........................ 429/309 |

* cited by examiner

*Primary Examiner* — Jane Rhee
(74) *Attorney, Agent, or Firm* — Richard T. Ogawa; Ogawa P.C.

(57) ABSTRACT

A vehicle propulsion system comprising a plurality of solid state rechargeable battery cells configured to power a drivetrain. In accordance with once aspect of the invention, a transportation system that is powered at least in part by electricity stored in the form of rechargeable electrochemical cells. According to an embodiment of the present invention, these cells are combined in series and in parallel to form a pack that is regulated by charge and discharge control circuits that are programmed with algorithms to monitor state of charge, battery lifetime, and battery health.

21 Claims, 8 Drawing Sheets

ELECTRIC VEHICLE PROPULSION SYSTEM AND METHOD UTILIZING SOLID-STATE RECHARGEABLE ELECTROCHEMICAL CELLS

CROSS-REFERENCES TO RELATED APPLICATIONS

This application claims priority to and is a continuation of application Ser. No. 14/083,325, filed on Nov. 18, 2013, which claims priority to and is a continuation of application Ser. No. 13/911,015, filed on Jun. 5, 2013, now U.S. Pat. No. 8,623,543, issued on Jan. 7, 2014, which claims priority to and is a continuation of Ser. No. 13/648,429, filed on Oct. 10, 2012, now U.S. Pat. No. 8,492,023, issued on Jul. 23, 2013, which claims priority to and is a continuation of application Ser. No. 13/294,980, filed on Nov. 11, 2011, now U.S. Pat. No. 8,357,464, issued on Jan. 22, 2013, which claims priority to and is a non-provisional of application 61/471,072, filed on Apr. 1, 2011, commonly assigned, and incorporated by reference herein. Also, the present application incorporates by reference, for all purposes, the following pending patent documents: U.S. patent application Ser. No. 12/484,959 filed Jun. 15, 2009, U.S. Pat. No. 7,945,344, filed Jun. 15, 2009.

BACKGROUND OF THE INVENTION

The invention relates to solid state rechargeable battery and vehicle propulsion. More particularly, the present invention provides a method and system for an all solid-state rechargeable battery and a vehicle propulsion system powered by the battery. Merely by way of example, the invention has been applied to a vehicle propulsion system, but there may be a variety of other applications.

Liquid and particulate based energy storage systems are known. That is, rechargeable electrochemical storage systems have long been employed in automotive and transportation applications, including passenger vehicles, fleet vehicles, electric bicycles, electric scooters, robots, wheelchairs, airplanes, underwater vehicles and autonomous drones. Rechargeable electrochemical storage systems with liquid or gel electrolytes are commonly used in these applications in order to take advantage of their relatively high ionic diffusivity characteristics. Different anode and cathode half-cell reactions have been deployed that can be categorized into conventional lead-acid, nickel-cadmium (NiCd), nickel-metal-hydride (NiMH), and Lithium-ion (Li-ion).

For example, conventional lead acid batteries contain electrodes of elemental lead (Pb) and lead oxide (PbO2) that are submersed in a liquid electrolyte of sulfuric acid (H2SO4). Rechargeable NiMH batteries typically consist of electrodes of that are submersed in a liquid alkaline electrolyte such as potassium hydroxide. The most common type of rechargeable Li-ion batteries typically consist of electrodes that are submersed in an organic solvent such as ethylene carbonate, dimethyl carbonate, and diethyl carbonate that contain dissolved lithium salts such as LiPF6, LiBF4 or LiClO4. In lithium-ion polymer batteries the lithium-salt electrolyte is not held in an organic solvent but in a solid polymer composite such as polyethylene oxide or polyacrylonitrile.

Liquid electrolytes generally require a non-conductive separators in order to prevent the shorting of the rechargeable battery cell. Microporous polymer separators are usually used in combination with liquid electrolytes such that lithium ions are permitted to pass through the separator between the electrodes but electrons are not conducted. However, these separators are relatively expensive, are the source of defects, and often detract from the energy density of the finished product.

Another problem with the use of organic solvent in the electrolyte is that these solvents can decompose during charging or discharging. When appropriately measured, the organic solvent electrolytes decompose on the initial charging and form a solid layer called the solid electrolyte interphase (SEI), which is electrically insulating, yet provides sufficient ionic conductivity.

These liquid or polymer electrolyte rechargeable electrochemical storage systems can be connected in series or in parallel in order to make additional voltage or current available at the pack level. Electrified drivetrain systems may demand power delivery in the range of 2 horsepower to 600 horsepower and they may require energy storage in the range of 1 kWh to 100 kWh, depending upon the needs of the vehicle, with power needs of over 1000 W/kg.

In order to meet these energy and power requirements while obtaining sufficient safety, the existing art teaches towards fabrication of smaller cathode particles, even in the nano-scale, such as the LiFePO4 nano-material that is being marketed by A123 Systems. These smaller nanoparticles reduce the transport distance any particular Li-ion needs to travel from the liquid electrolyte to reach the interior most point of the cathode particle, which reduces the generation of heat and stress in the cathode material during the charge and discharge of the battery. Therefore, it would be unexpected to one of ordinary skill in the art who is making battery cells for applications other than low discharge-rate microelectronics that a cathode film where the smallest axis is over one micron thick would create a viable product. Conventional manufacturers of rechargeable battery cells for electric vehicles and portable electronics generally prefer to select as cathodes heterogeneous, agglomerations comprised of nano- and micro-scaled particles that are mixed in a wet slurry and then extruded through a slotted die or thinned via a doctor blade, whereupon subsequent drying and compaction results in an open-cell, porous structure that admits liquid or gel electrolyte to permeate its pores providing intimate contact with the active material.

In addition, the conventional technique suggests that rectangular, prismatic cells such as those utilized by A123 Systems, Dow Kokam, LGChem, EnerDel and others in their electric vehicle battery packs must be contained in a pack that has foam or other compressible materials between the cells. The conventional technique teaches that over the lifetime of a large automotive battery pack these cells will undergo swelling, and foam or another compressible material is required to be used as a spacer between these battery cells in order to maintain sufficient pressure in the beginning of the pack's lifetime but which will also yield as the cells swell. The conventional technique also teaches compression bands or another mechanical mechanism to keep the external battery pack casing from opening as the cells swell. The conventional technique also teaches that pressure on the battery cells is required to assure good performance, putatively because of the maintenance of good contact and thus low contact resistance and good conductivity in the battery cells.

At the pack level, the conventional technique teaches that complex controls are needed to manage packs of battery cells, particularly to manage the unknown lifetimes that result from side reactions in agglomerated particulate cells between the active materials in combination with liquid or cell electrolytes at temperature extrema or at state-of-charge minima or maxima ranges. For example, these controls architectures typically possess algorithms that combine voltage monitoring with coulomb-counting mechanisms to estimate the current state-of-charge of each individual cell that is contained in the battery pack. Each cell may then be operated at the voltage and current of the cell that is measured to have the lowest voltage and charge in order to maintain cell lifetime and reduce the probabilities of a thermal runaway. Packs which are constructed from a plurality of cells named in this invention may not require such complex controls architectures due to the higher uniformity at the particle and cell level from alternate manufacturing techniques.

Existing solid state batteries, Solid-state batteries, such as those described in U.S. Pat. No. 5,338,625 have been developed that utilize a solid, often ceramic, electrolyte rather than a polymer or a liquid. However, public research of these electrolytes have shown that they are widely known to suffer from relatively low ionic conductivities (see "Fabrication and Characterization of Amorphous Lithium Electrolyte Thin Films and Rechargeable Thin-Film Batteries", J. B. Bates et al. Journal of Power Sources, 43-44 (1993) 103-110. In this invention, the inventors have used computational models they invented to determine the materials layer thicknesses and configurations that are optimal, knowing the ionic conductivity and diffusivity properties that are measured in the electrolyte, anode, and cathode materials of materials they have fabricated and which are in the literature. Furthermore, these solid-state batteries are typically produced on relatively small areas (less than 100 square centimeters) that limit the total capacity of the cell in Ampere-hours (Ah).

For example, the largest battery cell in the Thinergy line of solid state battery product that is currently produced by Infinite Power Solutions is stated to contain 2.5 mAh of total capacity in a package that has dimensions of 25.4 mm×50.8 mm×0.17 mm and a maximum current of 100 mA at a nominal voltage rating of 4.1 volts. These solid state battery cells have a nominal energy density of only 46.73 Wh/L which are far below the industry norm of 200-400 Wh/L for comparable Li-ion liquid electrolyte cells. In addition, the miniscule capacity of these cells that results from their design and the choice of utilizing a batch production process means that it would take over 1,500,000 of these cells connected in series and in parallel in order to achieve a pack with net nominal energy storage of at least 16 kWh, which is the energy storage capacity of a typical extended range electric vehicle (EREV) such as the Chevrolet Volt. Existing solid-state battery cell designs and fabrication processes therefore are impractical for inclusion in an electric vehicle drivetrain.

Moreover, these small solid-state batteries suffer from low energy density at the product scale due to a relatively large mass ratio of pack to active materials. Additionally, existing solid-state batteries are often made using expensive and low-rate methods such as sputtering and chemical vapor deposition (CVD). Other faster processes have been hypothesized, such as chemical bath deposition (CBD), but remain to be proven. These faster processes may reveal difficulties in producing uniform products with defect rates that are low enough to be tolerable to the transportation industry.

The selection of the substrate material is another important differentiator in the product that has been designed by the inventors. To date, practitioners of solid state batteries have selected substrates which are able to be annealed and which may be more robust during further packaging steps, such as ceramic plates, silicon wafers, metallic foils, and thicker polymer materials such as polyimides which are greater than 8 to 10 microns thick and which have high heat tolerances. None of these materials currently being used are available in gauges that are less than 5 to 10 microns thick. In contrast, in this invention the inventors have selected to pair a thinner polymer substrate, under 10 microns, which is not capable of being annealed.

Clearly, this trend leads to inherent problems in the current practice of device design and manufacturing. Accordingly, it is seen that there exists a need for an apparatus and method to produce an improved solid state battery for large scale production.

BRIEF SUMMARY OF THE INVENTION

According to the present invention, techniques related to solid state rechargeable battery and vehicle propulsion are provided. More particularly, the present invention provides a method and system for an all solid-state rechargeable battery and a vehicle propulsion system powered by the battery. Merely by way of example, the invention has been applied to a vehicle propulsion system, but there may be a variety of other applications.

In accordance with once aspect of the invention, a transportation system that is powered at least in part by electricity stored in the form of rechargeable electrochemical cells wherein those cells:
  Achieve a specific volumetric energy density of at least 300 Wh/L and have a nominal capacity of at least 1 Ampere Hour
  Contain a cathode material consisting of a phosphate or oxide compound that is capable of achieving substantial lithium or magnesium intercalation
  Contain anode material consisting of a carbonaceous, silicon, tin, lithium metal or other material that is capable of plating or intercalating lithium or magnesium
  Contain a solid electrolyte that consists of a phosphate or a ceramic
  Are produced on a roll-to-roll production process According to an embodiment of the present invention, these cells are combined in series and in parallel to form a pack that is regulated by charge and discharge control circuits that are programmed with algorithms to monitor state of charge, battery lifetime, and battery health.

This invention may be incorporated in a hybrid vehicle drive train, including full hybrid, mild hybrid, and plug-in hybrids. This invention may also be utilized with different drive train structures, including parallel hybrids, series hybrids, power-split, and series-parallel hybrids.

Although the above invention has been applied in a vehicle, the above can also be applied to any mobile computing device including, but not limited to smartphones, tablet computers, mobile computers, video game players, MP3 music players, voice recorders, motion detectors. Lighting systems that include a battery, LED or other organic light source, and solar panels may also be applied. Furthermore, aerospace and military applications such as starter motors, auxiliary power systems, satellite power sources, micro-sensor devices, and power sources for unmanned aerial vehicles may be applied.

The potential benefits of solid state batteries with ceramic separators have been discussed for over a decade, but to date few have truly commercialized this product. One challenge that plagued the commercialization of this product is the development of product design parameters with high levels of performance. Another challenge that has not been previously overcome is the development of a roll-to-roll production process that is required to make larger format-sized (greater than $1/10^{th}$ amp-hour) solid state batteries and winding them and packaging them in a format that can power products that require greater than a micro-amp of electrical current.

The design of a solid state battery cell that can be produced at scale has been limited by the absence of computational design tools and the high capital expenditures required to arrive near an optimized design through a trial-and-error process. This invention has been productized after years of work and millions of dollars of investment.

The inventors have completed a computational design toolset that utilizes physics-based codes and optimization algorithms to arrive at a set of optimized designs for solid-state batteries that are designed specifically for use in a number of applications. An example of such tool has been described in U.S. Ser. No. 12/484,959 filed Jun. 15, 2009, and titled COMPUTATIONAL METHOD FOR DESIGN AND MANUFACTURE OF ELECTROCHEMICAL SYSTEMS, commonly assigned, and hereby incorporated by reference herein. Without these tools it would be difficult it not impossible to calculate the optimal materials and layer thicknesses for the substrate, the cathode current collector, the cathode, the solid state electrolyte, the anode, and the anode current collector. This is the only design work of its kind that has been done computationally and verified experimentally, and an optimal set of designs has been generated after years of work and evaluation of literally millions of possible solid state battery designs.

The results of the invention are a solid state battery that has energy density above 300 Wh/L. Although this has been achieved using some battery systems that are designed with liquid or gel electrolytes, no solid state batteries with ceramic electrolytes have come close to achieving this level of energy density. Furthermore, the ceramic electrolytes and the design that is employed by Sakti3 eliminates the occurrence of lithium dendrites and other undesirable side reactions that occurs between the liquid or gel electrolyte and the battery materials in conventional wound lithium-ion batteries. Additionally, the solid ceramic electrolyte that is utilized in this invention also eliminates the occurrence of internal short circuits that are a major failure mechanism in lithium-ion battery cells that utilize a polymer separator.

Although Toyota and other have recently claimed to be working on solid state batteries none have been able to arrive at a design that is close to being capable of reaching the maturity needed for a product. For example, the batteries produced by Toyota recently were produced using a low-rate sputtering process with the same materials that have been used in conventionally-produced liquid-electrolyte lithium-ion batteries for over 15 years. The Toyota design was a 4" by 4" cell with positive and negative electrolytes where the active materials were lithium cobalt oxide and graphite, according to Nikkei Electronics.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

According to the present invention, techniques related to solid state rechargeable battery and vehicle propulsion are provided. More particularly, the present invention provides a method and system for an all solid-state rechargeable battery and a vehicle propulsion system powered by the battery. Merely by way of example, the invention has been applied to a vehicle propulsion system, but there may be a variety of other applications.

In accordance with once aspect of the invention, a transportation system that is powered at least in part by electricity stored in the form of rechargeable electrochemical cells wherein those cells:

Achieve a specific volumetric energy density of at least 300 Wh/L and have a nominal capacity of at least 1 Ampere Hour Contain a cathode material consisting of a phosphate or oxide compound that is capable of achieving substantial lithium or magnesium intercalation Contain anode material consisting of a carbonaceous, silicon, tin, lithium metal or other material that is capable of plating or intercalating lithium or magnesium Contain a solid electrolyte that consists of a phosphate or a ceramic Are produced on a roll-to-roll production process According to an embodiment of the present invention, these cells are combined in series and in parallel to form a pack that is regulated by charge and discharge control circuits that are programmed with algorithms to monitor state of charge, battery lifetime, and battery health.

This invention may be incorporated in a hybrid vehicle drive train, including full hybrid, mild hybrid, and plug-in hybrids. This invention may also be utilized with different drive train structures, including parallel hybrids, series hybrids, power-split, and series-parallel hybrids.

Although the above invention has been applied in a vehicle, the above can also be applied to any mobile computing device including, but not limited to smartphones, tablet computers, mobile computers, video game players, MP3 music players, voice recorders, motion detectors. Lighting systems that include a battery, LED or other organic light source, and solar panels may also be applied. Furthermore, aerospace and military applications such as starter motors, auxiliary power systems, satellite power sources, micro-sensor devices, and power sources for unmanned aerial vehicles may be applied.

The potential benefits of solid state batteries with ceramic separators have been discussed for over a decade, but to date few have truly commercialized this product. One challenge that plagued the commercialization of this product is the development of product design parameters with high levels of performance. Another challenge that has not been previously overcome is the development of a roll-to-roll production process that is required to make larger format-sized (greater than $1/10^{th}$ amp-hour) solid state batteries and winding them and packaging them in a format that can power products that require greater than a micro-amp of electrical current.

The design of a solid state battery cell that can be produced at scale has been limited by the absence of computational design tools and the high capital expenditures required to arrive near an optimized design through a trial-and-error process. This invention has been productized after years of work and millions of dollars of investment.

The inventors have completed a computational design toolset that utilizes physics-based codes and optimization algorithms to arrive at a set of optimized designs for solid-state batteries that are designed specifically for use in a number of applications. An example of such tool was been described in U.S. Ser. No. 12/484,959 filed Jun. 15, 2009, and titled COMPUTATIONAL METHOD FOR DESIGN AND MANUFACTURE OF ELECTROCHEMICAL SYSTEMS, commonly assigned, and hereby incorporated by reference herein. Without these tools it would be difficult it not impossible to calculate the optimal materials and layer thicknesses for the substrate, the cathode current collector, the cathode, the solid state electrolyte, the anode, and the anode current collector. This is the only design work of its kind that has been done computationally and verified experimentally, and an optimal set of designs has been generated after years of work and evaluation of literally millions of possible solid state battery designs.

The results of the invention are a solid state battery that has energy density above 300 Wh/L. Although this has been achieved using some battery systems that are designed with liquid or gel electrolytes, no solid state batteries with ceramic electrolytes have come close to achieving this level of energy density. Furthermore, the ceramic electrolytes and the design that is employed by Sakti3 eliminates the occurrence of lithium dendrites and other undesirable side reactions that occurs between the liquid or gel electrolyte and the battery materials in conventional wound lithium-ion batteries. Additionally, the solid ceramic electrolyte that is utilized in this invention also eliminates the occurrence of internal short circuits that are a major failure mechanism in lithium-ion battery cells that utilize a polymer separator.

Although Toyota and other have recently claimed to be working on solid state batteries none have been able to arrive at a design that is close to being capable of reaching the maturity needed for a product. For example, the batteries produced by Toyota recently were produced using a low-rate sputtering process with the same materials that have been used in conventionally-produced liquid-electrolyte lithium-ion batteries for over 15 years. The Toyota design was a 4" by 4" cell with positive and negative electrolytes where the active materials were lithium cobalt oxide and graphite, according to Nikkei Electronics.

Figure 1:
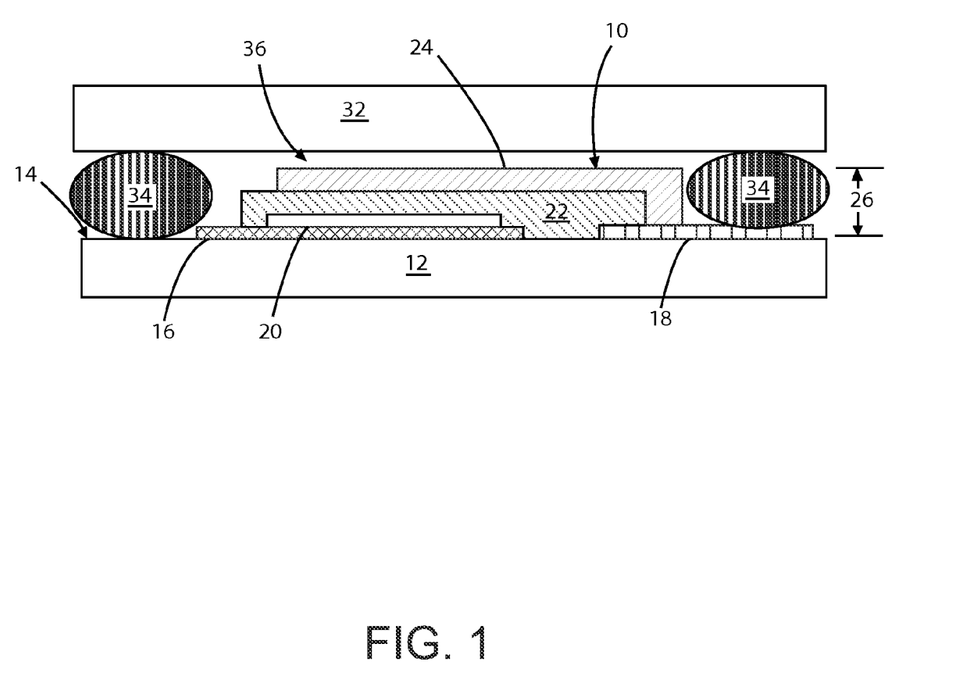
FIG. 1 is a cross-sectional diagram of a current state-of-the-art solid-state battery cell.

FIG. 1 is the profile view of a current state-of-the-art solid state battery. In this diagram, a cathode current collector (16) is deposited onto a thick substrate (12) using a masking technique in a fashion such that it does not contact a similarly deposited anode current collector (18). A cathode material (20) is deposited onto the cathode current collector (16). An ion-conducting electrical insulator (22) is also deposited. An anode material (24) is then deposited on top of the electrolyte such that it contacts the anode current collector (18). The electrochemical cell layers 10 comprise these previously mentioned elements. The cell is deposited on a stationary substrate 12. The cell has an energy density less than 40 Wh/kg and contains less than 0.1 Ah of capacity.

Figure 2:
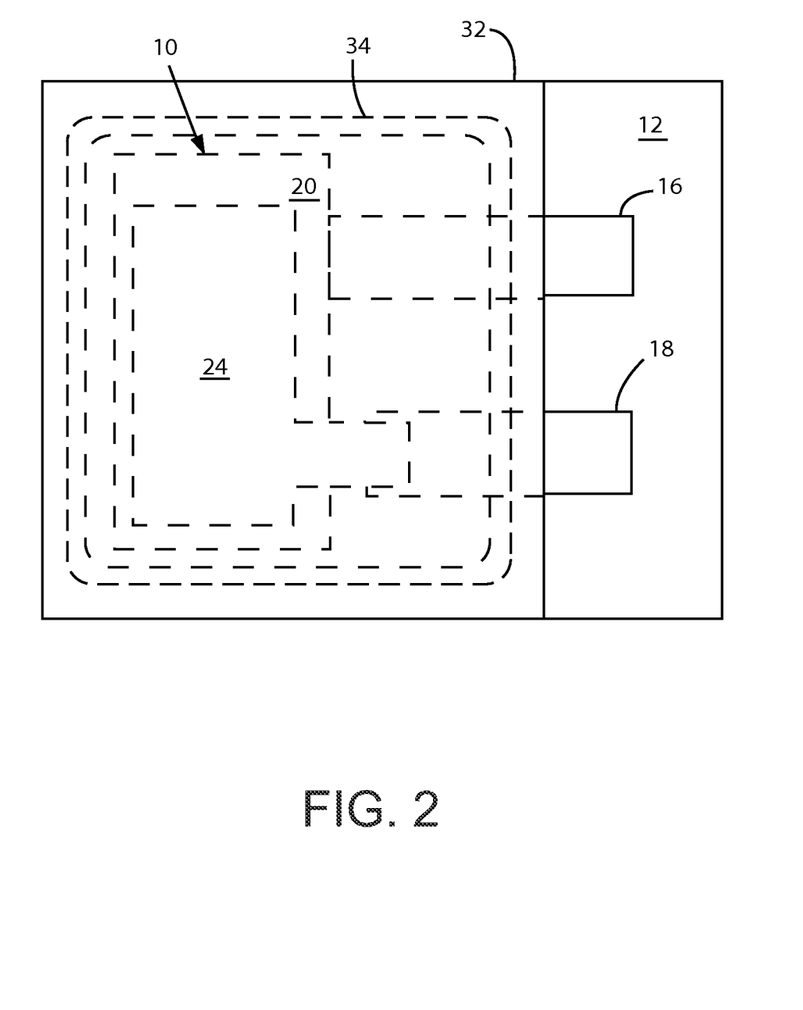
FIG. 2 is an overhead diagram of a current state-of-the-art solid-state battery cell.

FIG. 2 is a top-down view of the same cell described in the conventional cell shown in FIG. 1. The configuration of the electrochemical cell layers 10 from FIG. 1 can be seen from above in FIG. 2. The entire cell measures less than 8 inches per side. The cell is hermetically sealed (32). A positive tab (16) and a negative tab (18) protrude from the packaged cell.

Figure 3:
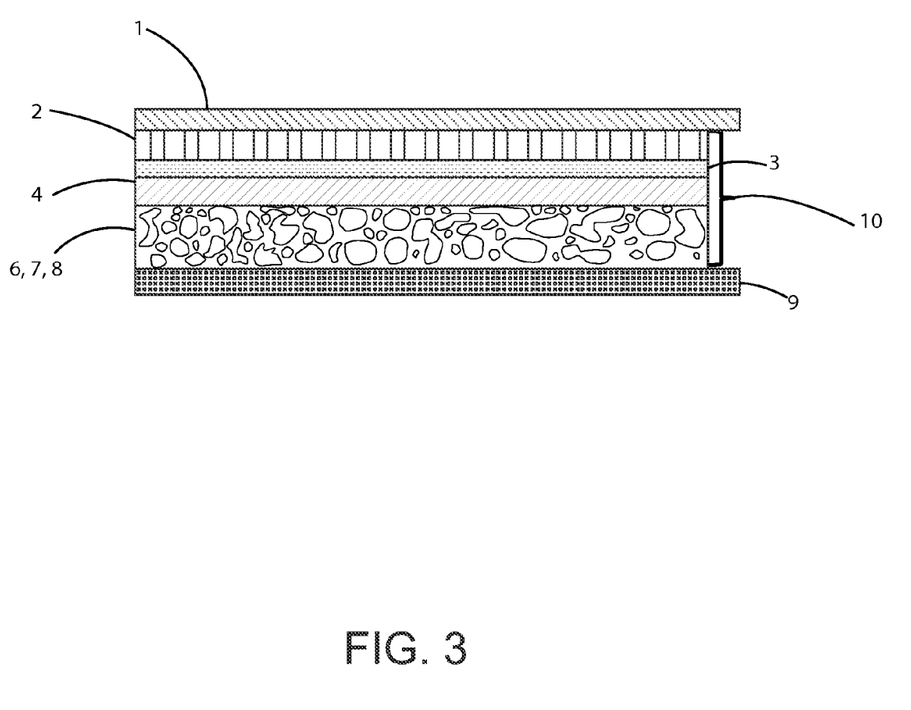
FIG. 3 is a cross sectional diagram of a current state-of-the-art particulate battery cell.

FIG. 3 is a cross-section of the current state-of-the-art particulate battery materials stacked architecture that is used in virtually all commercial Li-ion products in automotive and consumer electronics. An agglomeration of cathode particles, cinder materials, and conductive coatings (6, 7, and 8) are agglomerated as the positive electrode. This agglomerate layer is between 50 microns and 350 microns thick. A porous separator (4) ranging between 10 microns and 50 microns thick separates the anode half reaction from the cathode half reaction. An insertion material such as carbon is used as the negative electrode (2). A solid electrolyte interface layer (3) is intentionally formed on the anode after the fabrication of the cell in the step known as "formation". An aluminum current collector (9) collects electrons from the cathode and a copper current collector (1) collects electrons from the anode. The mixture is bathed in a liquid or polymer electrolyte solvent (10) that conducts ions and electrons once they are outside of the particulate materials.

Figure 4:
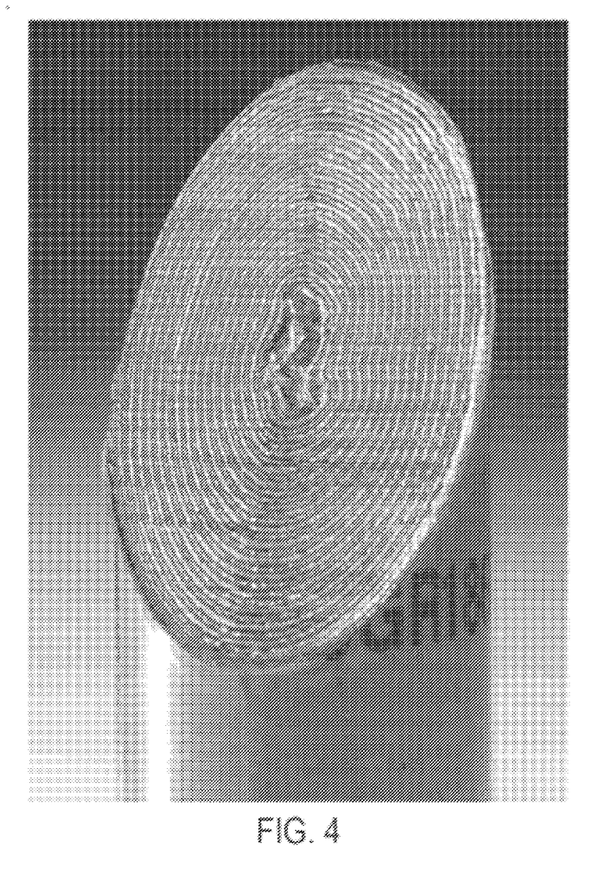
FIG. 4 is a photograph of a diagonal cross section of an actual wound current state-of-the-art lithium-ion battery.

FIG. 4 is a picture showing the cross-section of a current state-of-the-art lithium-ion battery "jellyroll" cell. The cell is wound less than 50 times around.

Figure 5:
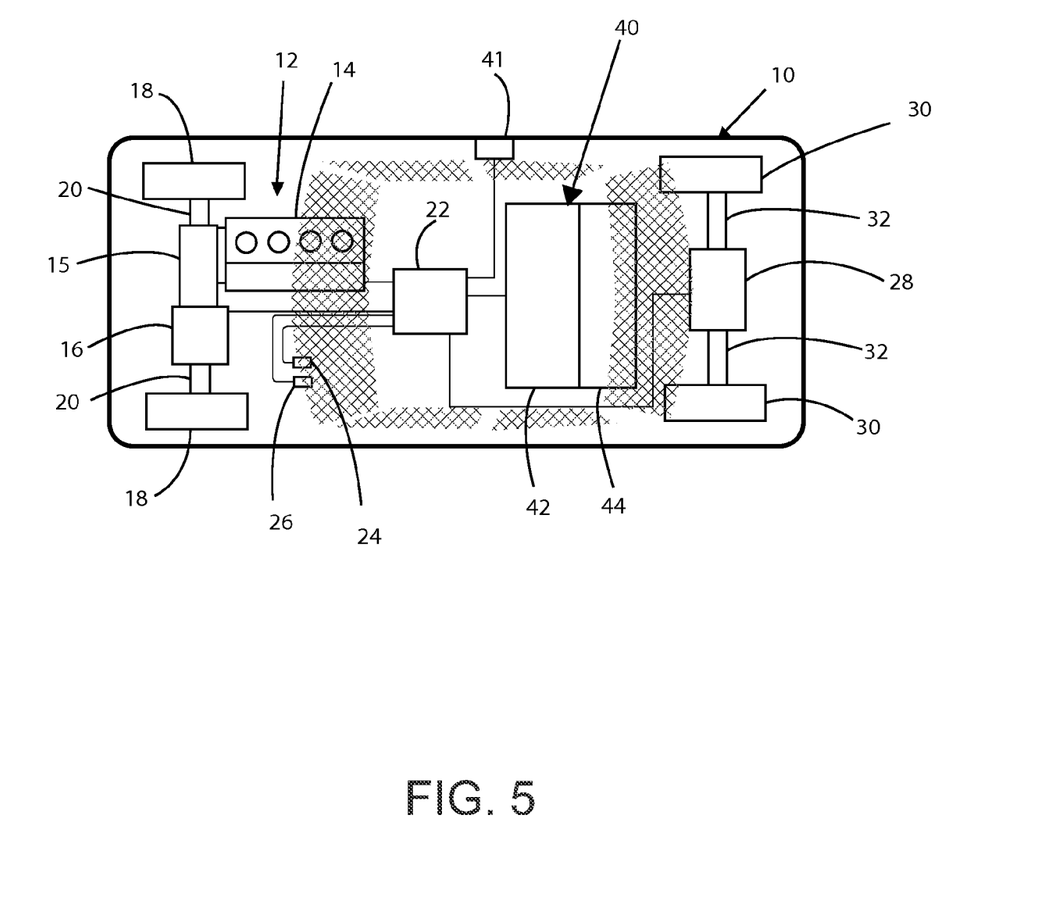
FIG. 5 is a schematic diagram of vehicle including an electrified drivetrain and associated electrical energy storage system.

FIG. 5 is schematic of a vehicle 10 incorporating an electrified drivetrain 12, and in particular a hybrid electrified drivetrain. Embodiments of the present invention have application to virtually any vehicle incorporating a completely electrified (EV) or partially electrified (HEV) drivetrain including plug-in type electrified drivetrains. The vehicle 10 is illustrated and described only as a single possible implementation of an embodiment of the present invention. It is understood that numerous other configurations of the vehicle 10 and the electrified drivetrain 12 are possible. For example, energy storage modules 42 and 44, described below, are not limited to be installation in the same compartment. They could be arranged in different locations, such that they could be more easily accessible to target electronic devices, such as an air conditioner, DC motor, etc.

The electrified drivetrain 12 includes an internal combustion engine 14 coupled to a variable speed transmission 15 and traction motor 16 to drive the front wheels 18 of the vehicle 10 via propulsion shafts 20. The transmission 15 and the traction motor 16 are coupled to a controller 22 responsive to inputs from an accelerator control 24 and a brake control 26 accessible to the vehicle operator. While the above is a full description of the specific embodiments, various modifications, alternative constructions and equivalents may be used.

FIG. 5 depicts a single traction motor 16 coupled to the transmission 15, but multiple traction motors may be used. For example, fraction motors can be associated with each of the wheels 18. As FIG. 5 depicts, a traction motor 28 may be provided to drive rear wheels 30 via propulsion shafts 32, the traction motor 28 being coupled to the controller 22. Alternative configurations of the electrified drivetrain 12 may provide for primary driving of the rear wheels 30 via the transmission 15 and traction motor 16, driving of the front wheels 18 and the rear wheels 30 and various combinations driving the front wheels 18 and/or the rear wheels 30 via a variable speed transmission and traction motors.

Electric energy is supplied to the traction motor 16 and the traction motor 28 (if provided) from a hybrid energy storage system 40 via the controller 22. In accordance with embodiments of the invention, the hybrid energy storage system 40 includes a plurality of energy storage modules, two are illustrated as energy storage module 42 and energy storage module 44. The hybrid energy storage system 40 may incorporate more than two energy storage modules. Modules may be a set of cells having specific characteristics, such as cell configuration, cell chemistry, control and the like.

Electric energy may be provided to the hybrid energy storage system 40 by operating the fraction motor 16 in a generating mode driven by the internal combustion engine 14. Energy may further be recovered and delivered to the hybrid energy storage system 40 during vehicle breaking by operating the traction motor 16 and/or traction motor 28 in a regenerative breaking mode. Energy also may be provided to the hybrid energy storage system 40 via a plug-in option via a plug-in interface 41.

In an embodiment, the hybrid energy storage system 40 is a hybrid battery system that incorporates a first battery system portion or module 42 and a second battery system or module 44. The first module 42 may have a first battery architecture and the second module 44 may have a second battery architecture, different than the first battery architecture. Different battery architecture is meant to refer to any or all of cell configuration, cell chemistry, cell number, cell size, cell coupling, control electronics, and other design parameters associated with that portion of the battery system that may be different than the same parameter when viewed against the corresponding portion or portions. It may be preferable to have the battery pack to be located near certain electronic devices. Hence, energy storage modules 42 and 44 may not be necessarily installed in the same compartment as the hybrid energy storage system 40. Those of ordinary skill in the art will recognize other variations, modifications, and alternatives.

The above described system can be an embodiment of a vehicle propulsion system comprising a plurality of solid state rechargeable battery cells configured to power a drivetrain. In various embodiments, the system can include a rolled substrate having a surface region, at least one electrochemical cell overlying the surface region, and an electrically conductive material.

The rolled substrate can be less than 10 microns in thickness along a shortest axis. In a specific embodiment, the substrate can comprise a polyethylene terephthalate (PET), a biaxxially oriented polypropylene film (BOPP), a polyethylene naphtahalate (PEN), a polyimide, polyester, a polypropylene, an acrylact, an arimide, or a metallic material which is less than 10 microns thick.

The electrochemical cell(s) can include a positive electrode, a solid state layer, and a negative electrode. The positive electrode can include a transition metal oxide or transition metal phosphate. The positive electrode can also be characterized by a thickness between 0.5 and 50 microns. The electrically conductive material can be coupled to the positive electrode material while being free from the negative electrode material. The solid state layer can comprise a ceramic, polymer, or glass material configured for conducting lithium or magnesium ions during a charge and discharge process. The solid state layer can be characterized by a thickness between 0.1 and 5 microns. The negative electrode material can be configured for electrochemical insertion or plating of ions during the charge and discharge process. The negative electrode material can be characterized by a thickness between 0.5 and 50 microns. Of course, there can be other variations, modifications, and alternatives.

Also, the layer of positive and negative electrode materials can each have a total surface area greater than 0.5 meters, wherein the rolled substrate is made of at least a polymer, a metal, a semiconductor, or an insulator. These layers can be wound into a container that has an external surface area less than $1/100^{th}$ the surface area of the active materials layer. In a specific embodiment, the layers of electrochemically active materials can be continuously wound or stacked at least 30 times per cell. The negative electrode material can include an alloy of lithium metal alloy such that the melting point or the alloy is greater than 150 degrees Celsius.

The battery cells, or electrochemical cells, found in embodiments of the vehicle propulsion system can have many favorable performance characteristics. The battery cells can have energy densities of no more than 50 Watt-hours per square meter of electrochemical cells or they can have energy densities of at least 700 Watt-hours per liter. The battery cells can also have specific energies of at least 300 Watt-hours per kilogram. In a specific embodiment, the battery cells can be capable of achieving at least 5000 cycles while being cycled at 80% of the rated capacity and which have gravimetric energy densities of at least 250 Wh/kg.

In various embodiments, these battery cells can be applied in one or more of at least a smartphone, a cellular phone, a radio or other portable communication device, a laptop computer, a tablet computer, a portable video game system, an MP3 player or other music player, a camera, a camcorder, an RC car, an unmanned aeroplane, a robot, an underwater vehicle, a satellite, a GPS unit, a laser range finder, a flashlight, an electric street lighting, and other portable electronic devices. Also, these battery cells can be free from solid electrolyte interface/interphase (SEI) layers.

In a specific embodiment, the system can further comprise a multicell, rechargeable battery pack. The multi-cell rechargeable battery pack can include a plurality of solid state rechargeable cells. A first portion of these cells can be connected in a series relationship, and a second portion of said cells can be connected in a parallel relationship. Also, this multicell rechargeable battery pack can include a heat transfer system and one or more electronics controls configured to maintain an operating temperature range between 60 degrees Celsius and 200 degrees Celsius. The plurality of rechargeable cells can comprise respective outermost portions of the plurality of rechargeable cells. Each of these outermost portions can be in proximity of less than 1 millimeter from each other. Furthermore, the multicell rechargeable solid state battery pack can be insulated by one or more materials that have thermal resistance with an R-value of at least 0.4 $m^2*K/(W*in)$.

In another specific embodiment, the system with the multicell, rechargeable solid state battery pack having the solid state rechargeable battery cells can further comprise a plurality of capacitors configured at least in serial or parallel to provide a higher net energy density than the plurality of capacitors alone or conventional particulate electrochemical cells without being combined with the solid state rechargeable battery cells, and wherein the multicell, rechargeable solid state battery pack is characterized by an energy density of at least 500 Watts per kilogram. The solid state rechargeable battery cells can be configured in a wound or stacked structure; and utilizing lithium or magnesium as a transportion, the solid state rechargeable battery cells being configured in a format larger than 1 Amp-hour; and configured to free from a solid-electrolyte interface layer; the solid state rechargeable battery cells being capable of greater than 80% capacity retention after more than 1000 cycles. Such systems and other embodiments of like systems according to embodiments of the present invention can be provided within a vehicle that is powered at least in part by these systems.

Figure 6A:
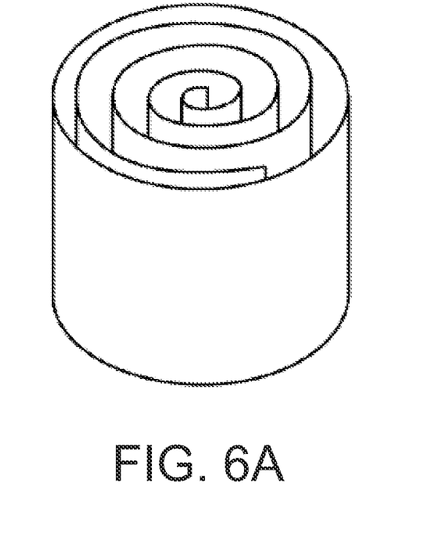
FIG. 6A is a simplified drawing of a wound solid state battery cell according to an embodiment of the present invention.

FIG. 6A is a simplified drawing of an all solid-state rechargeable battery cell is depicted that is wound. Although a few windings are made, this invention claims rechargeable solid state battery cells that include over 50 windings per cell. The solid state cells in this invention may also be packaged using z-fold, stacking, or plating techniques.

Figure 6B:
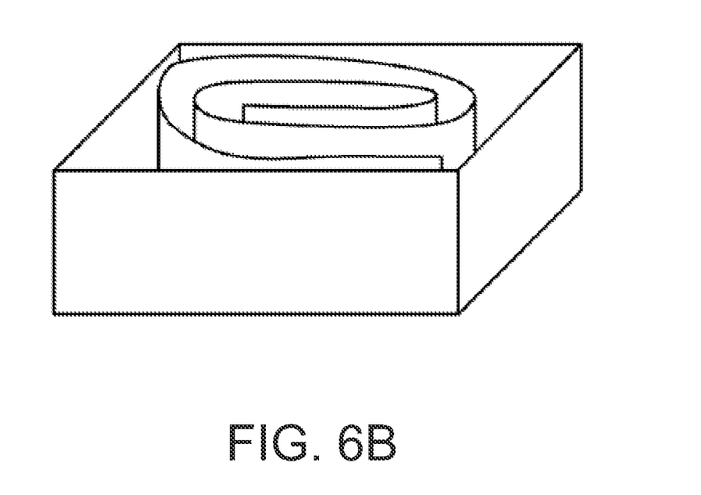
FIG. 6B is a simplified drawing of a wound solid state battery cell that is compressed into a non-cylindrical container form factor according to an embodiment of the present invention.

FIG. 6B is a simplified drawing of a wound rechargeable solid state battery that is compressed after it is wound to fit into a non-cylindrical form factor. In this invention, the compression of the rechargeable solid state battery films is done without cracking, peeling, or other defects of the substrate or of the deposited films.

Figure 7:
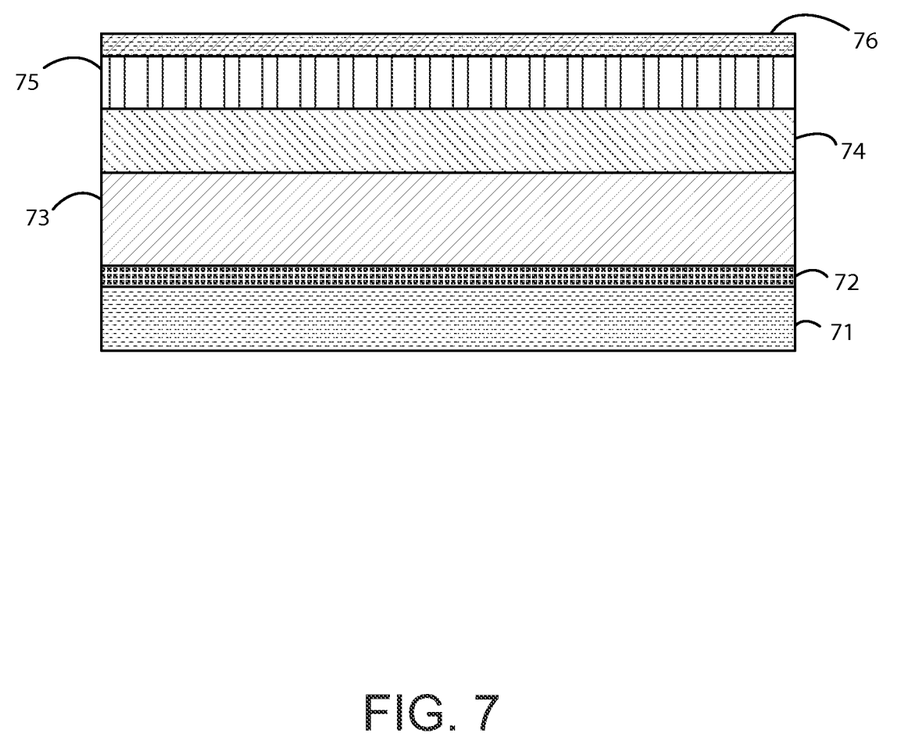
FIG. 7 is a simplified cross-sectional diagram of a solid state battery cell.

FIG. 7 is a simplified drawing of a cross section of the active materials layers according to an embodiment of the present invention. A metallic current collector (72) is deposited on a long strip of a thin substrate (71). A positive electrode material (73) is deposited on this current collector (72) and is separated from the metallic anode material (75) by a solid ion-conducting electrolyte (74). A metallic current collector strip is also attached to the anode prior to cutting, winding, or stacking the cell.

This device is capable of achieving at least 250 Wh/kg in applications requiring greater than 0.5 watt-hours of rated energy to be supplied to the device. The energy density capabilities are greater in larger devices, to the reduction of the relative mass percentage of non-active materials.

This invention is different from the current teachings in that the Wh per square meter of surface on the film is less than 50 Wh per square meter, a figure which is less than one half the Wh per square meter of Li-ion batteries currently being used in automotive and portable electronics applications. This requires the cell to be wound through many more rotations in order to achieve the same energy density, and with much greater precision to maintain a defect-free film. The invention also utilizes a single, uniform stripe of cathode material physically joined to the ceramic separator rather than a compaction of particles that are immersed in a liquid electrolyte.

Figure 8:
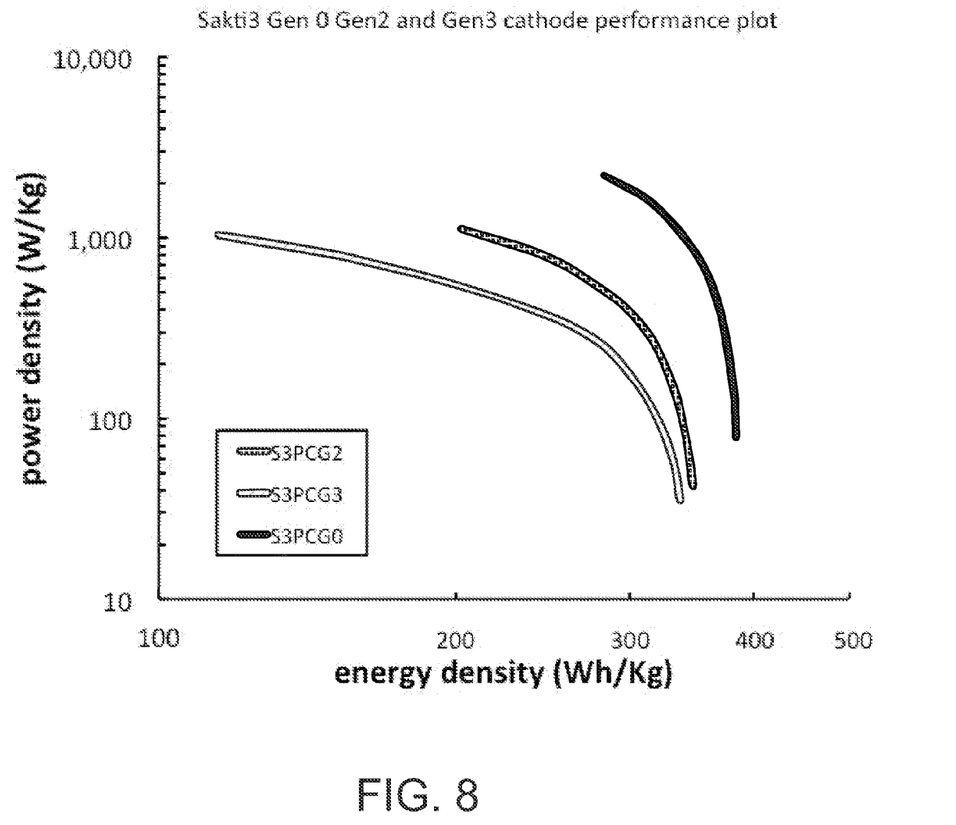
FIG. 8 is a ragone plot showing the simulated energy density according to an embodiment of the present invention.

FIG. 8 is a simulated ragone of three different solid-state battery system design that is described in example 1 below using computational codes that were developed by the inventors that include aspects of finite-element analysis and multiphysics codes. Each design represents a different combination of layer thicknesses and cathode material. This battery cell is simulated to have an energy density greater than 300 Wh per kilogram and is produced using the proprietary manufacturing technique that was developed by the inventors.

EXAMPLE 1

In this specific embodiment the cell is fabricated on a wound polymer substrate that is less than 5 microns thick. A metallic cathode current collector less than 0.2 microns thick is deposited onto this substrate, upon which a transition-metal oxide cathode material is deposited that is less than 10 microns thick. A ceramic electrolyte layer is then deposited that is less than 2 microns thick, and a metallic anode containing at least 50% lithium metal is deposited on this electrolyte. The dimensions of the substrate are at least 1 cm by 100 cm, and the thickness of the entire structure is less than 50 microns thick.

While the above is a full description of the specific embodiments, various modifications, alternative constructions and equivalents may be used. As an example, the present application including methods may be used with one or more elements of U.S. Ser. No. 12/484,966 filed Jun. 15, 2009, titled METHOD FOR HIGH VOLUME MANUFACTURE OF ELECTROCHEMICAL CELLS USING PHYSICAL VAPOR DEPOSITION, commonly assigned, and hereby incorporated by reference herein. The present methods and apparatus may also be used with the techniques described in U.S. Pat. No. 7,945,344, commonly assigned, and hereby incorporated by reference herein. Therefore, the above description and illustrations should not be taken as limiting the scope of the present invention which is defined by the appended claims.

What is claimed is:

1. A method of using an energy storage apparatus comprising a plurality of solid state rechargeable battery cells configured to power an appliance, the method comprising providing the apparatus comprising:
   a substrate member comprising a surface region;
   a stack of electrochemical cells configured overlying the surface region of the substrate member, each electrochemical cell formed overlying the surface of a thickness of material, said electrochemical cell having an overall thickness of less than 50 microns, each of said electrochemical cells comprising:
   the thickness of material;
   a positive electrode material comprised of a transition metal oxide or a transition metal phosphate, the positive electrode material characterized by a thickness between 0.5 micron and 50 microns;
   a solid state layer of a ceramic, polymer, or glassy material configured for conducting lithium or magnesium ions during a charge and discharge process, the solid state layer characterized by a thickness between 0.1 micron and 5 microns; and
   a negative electrode material configured for electrochemical insertion or plating of ions during the charge and discharge process, the negative electrode material characterized by a thickness between 0.5 micron and 50 microns; and
   an electrically conductive material coupled with the positive electrode material and free from contact with the negative electrode material,
   wherein said layer of positive and negative electrode materials each have a total surface area greater than 0.5 meters,
   wherein the substrate member is made of at least a polymer, a metal, a semiconductor, or an insulator;
   whereupon the positive electrode material comprises a positive electrode layer; the negative electrode material comprises a negative electrode layer; the electrically conductive material comprising an electrically conductive layer, and
   whereupon the plurality of electrochemical cells, each of the electrochemical cells comprising the positive electrode layer, the solid state layer, the negative electrode layer, are continuously wound or stacked; and
   supplying power to the appliance using the energy storage apparatus.

2. The method of claim 1, wherein said layers are stacked together and provided in a container that has an external surface area less than 1/100th the surface area of the electrochemical cells.

3. The method of claim 1, wherein said layers are wound into a container that has an external surface area less than 1/100th the surface area of the electrochemical cells.

4. The method of claim 1, wherein the aspect ratio of the uniform cathode material layer is greater than 500,000 when dividing the length of the longest axis by the length of the shortest axis.

5. The method of claim 1, wherein said layers are continuously wound or stacked at least 30 times.

6. The method of claim 1 wherein said battery cells have energy densities of no more than 50 Watt-hours per square meter of electrochemical cells.

7. The method of claim 1 wherein the substrate member comprises a polyethylene terephthalate (PET), a biaxxially oriented polypropylene film (BOPP), a polyethylene naphtahalate (PEN), a polyimide, polyester, a polypropylene, an acrylact, an arimide, or a metallic material which is less than 10 microns thick.

8. The method of claim 1 wherein said battery cells are free from solid electrolyte interface/interphase (SEI) layers.

9. The method of claim 1 wherein said negative electrode material comprises an lithium metal alloy such that the melting point of the alloy is greater than 150 degrees Celsius.

10. The method of claim 1 wherein said battery cells have specific energies of at least 300 Watt-hours per kilogram.

11. The method of claim 1 wherein said battery cells have energy densities of at least 700 Watt-hours per liter.

12. The method of claim 1 wherein said battery cells are capable of achieving at least 5,000 cycles while being cycled at 80% of the rated capacity and which have gravimetric energy densities of at least 250 Wh/kg.

13. The method of claim 1 wherein said appliance is selected from at least one of or more of at least a smartphone, a cellular phone, a radio or other portable communication device, a laptop computer, a tablet computer, a portable video game system, an MP3 player or other music player, a camera, a camcorder, an RC car, an unmanned aeroplane, an aeroplane, a vehicle, a robot, an underwater vehicle, a satellite, a GPS unit, a laser rangefinder, a flashlight, an electric street lighting, and other portable electronic devices.

14. The method of claim 1 further comprising a multicell, rechargeable solid state battery pack, the multi-cell rechargeable battery pack comprising a plurality of solid state rechargeable cells; a first portion of said cells being connected in a series relationship; and a second portion of said cells being connected in a parallel relationship.

15. The method of claim 14 wherein said multicell, rechargeable solid state battery pack is comprised of a heat transfer system and one or more electronics controls configured to maintain an operating temperature range between 60 degrees Celsius and 200 degrees Celsius.

16. The method of claim 15 wherein the plurality of rechargeable cells comprises respective outermost portions of the plurality of rechargeable cells, each of the outermost portions is in proximity of less than 1 millimeter from each other.

17. The method of claim 13 wherein the multicell, rechargeable solid state battery pack is insulated by one or more materials that have thermal resistance with an R-value of at least 0.4 $m^2 * K/(W * in)$.

18. The method of claim 1 further comprising a multicell, rechargeable solid state battery pack having the solid state rechargeable battery cells; and a plurality of capacitors configured at least in serial or parallel to provide a higher net energy density than the plurality of capacitors alone or conventional particulate electrochemical cells without being combined with the solid state rechargeable battery cells, and wherein the multicell, rechargeable solid state battery pack is characterized by an energy density of at least 500 Watts per kilogram.

19. The method of claim 1 is provided within a vehicle that is powered by at least in part by the apparatus.

20. The method of claim 1 wherein the solid state rechargeable battery cells are configured in a wound or stacked structure; and utilizing lithium or magnesium as a transportion, the solid state rechargeable battery cells being configured in a format larger than 1 Amp-hour; and configured to be free from a solid-electrolyte interface layer; the solid state rechargeable battery cells being capable of greater than 80% capacity retention after more than 1000 cycles.

21. A method of using an energy storage apparatus comprising a plurality of solid state rechargeable battery cells configured to power an appliance, the method comprising providing the apparatus comprising:
  a substrate member comprising a surface region;
  a stack of electrochemical cells configured overlying the surface region of the substrate member, each electrochemical cell formed overlying the surface of a thickness of material, said electrochemical cell having an overall thickness of less than 50 microns, each of said electrochemical cells comprising:
    the thickness of material;
    a positive electrode material comprised of a transition metal oxide or a transition metal phosphate, the positive electrode material characterized by a thickness between 0.5 micron and 50 microns;
    a solid state layer of a ceramic, polymer, or glassy material configured for conducting lithium or magnesium ions during a charge and discharge process, the solid state layer characterized by a thickness between 0.1 micron and 5 microns; and
    a negative electrode material configured for electrochemical insertion or plating of ions during the charge and discharge process, the negative electrode material characterized by a thickness between 0.5 micron and 50 microns; and
  an electrically conductive material coupled with the positive electrode material and free from contact with the negative electrode material,
  wherein said layer of positive and negative electrode materials each have a total surface area greater than 0.5 meters,
  wherein the substrate member is made of at least a polymer, a metal, a semiconductor, or an insulator,
  whereupon the positive electrode material comprises a positive electrode layer; the negative electrode material comprises a negative electrode layer; the electrically conductive material comprising an electrically conductive layer,
  whereupon the plurality of electrochemical cells, each of the electrochemical cells comprising the positive electrode layer, the solid state layer, the negative electrode layer, are continuously wound or stacked, and
  wherein said battery cells have specific energies of at least 300 Watt-hours per kilogram;
supplying power to the appliance using the energy storage apparatus.

* * * * *